US007072772B2

(12) United States Patent
Ahmed et al.

(10) Patent No.: US 7,072,772 B2
(45) Date of Patent: Jul. 4, 2006

(54) METHOD AND APPARATUS FOR MODELING MASS SPECTROMETER LINESHAPES

(75) Inventors: Zulfikar Ahmed, San Fransisco, CA (US); Hans Bitter, San Fransisco, CA (US)

(73) Assignee: Predicant BioScience, Inc., South San Francisco, CA (US)

( * ) Notice: Subject to any disclaimer, the term of this patent is extended or adjusted under 35 U.S.C. 154(b) by 254 days.

(21) Appl. No.: 10/462,228

(22) Filed: Jun. 12, 2003

(65) Prior Publication Data

US 2004/0254741 A1 Dec. 16, 2004

(51) Int. Cl.
*G01N 31/00* (2006.01)

(52) U.S. Cl. ........................................ 702/27; 250/399

(58) Field of Classification Search ............ 702/22–32, 702/19–21, 66, 190, 197, 69, 71, 73, 77, 702/81, 129, 191; 250/281, 288, 287, 289, 250/290, 399; 436/94; 708/300
See application file for complete search history.

(56) References Cited

U.S. PATENT DOCUMENTS 5,247,175 A 9/1993 Schoen et al.
5,300,771 A 4/1994 Labowsky
5,649,068 A 7/1997 Boser et al.
5,770,857 A * 6/1998 Fuerstenau et al. ......... 250/281
5,864,137 A * 1/1999 Becker et al. .............. 250/287
5,910,655 A 6/1999 Skilling
5,952,653 A 9/1999 Covey et al.
5,995,989 A * 11/1999 Gedcke et al. .............. 708/300
6,017,693 A 1/2000 Yates, III et al.
6,107,625 A * 8/2000 Park ........................... 250/287
6,128,608 A 10/2000 Barnhill
6,157,921 A 12/2000 Barnhill
6,300,626 B1 10/2001 Brock et al.
6,306,087 B1 10/2001 Barnhill et al.
6,363,383 B1 3/2002 Kindo et al.
6,379,971 B1 4/2002 Schneider et al.
6,427,141 B1 7/2002 Barnhill
6,437,325 B1 * 8/2002 Reilly et al. ............. 250/252.1
6,489,121 B1 12/2002 Skilling
6,489,608 B1 12/2002 Skilling
6,521,887 B1 * 2/2003 Funsten et al. ............. 250/287
6,610,976 B1 * 8/2003 Chait et al. ................ 250/281

(Continued)

FOREIGN PATENT DOCUMENTS

WO WO 98/35226 8/1998

(Continued)

OTHER PUBLICATIONS

Jerome Kalifa et al., Regularization in tomographic reconstruction using thresholing estimators, Mar. 2003, IEEE transaction on medical imaging, vol. 2, No. 3, pp. 351-359.*

(Continued)

*Primary Examiner*—Hal Wachsman
*Assistant Examiner*—Mohamed Charioui
(74) *Attorney, Agent, or Firm*—Wilson Sonsini Goodrich & Rosati

(57) ABSTRACT

Methods and apparatuses are disclosed that model the lineshapes of mass spectrometry data. Ions can be modeled with an initial distribution that models molecules as having multiple positions and/or energies prior to traveling in the mass spectrometer. These initial distributions can be pushed forward by time of flight functions. Fitting can be performed between the modeled lineshapes and empirical data. Filtering can greatly reduce dimensions of the empirical data, remove noise, compress the data, recover lost and/or damaged data.

38 Claims, 8 Drawing Sheets

U.S. PATENT DOCUMENTS

| | | | | |
|---|---|---|---|---|
| 6,658,395 | B1 | 12/2003 | Barnhill | |
| 6,675,104 | B1 * | 1/2004 | Paulse et al. | 702/22 |
| 6,714,925 | B1 | 3/2004 | Barnhill et al. | |
| 6,760,715 | B1 | 7/2004 | Barnhill et al. | |
| 6,789,069 | B1 | 9/2004 | Barnhill et al. | |
| 6,794,647 | B1 * | 9/2004 | Farnsworth et al. | 250/281 |
| 6,803,564 | B1 * | 10/2004 | Kawato | 250/287 |
| 6,815,689 | B1 * | 11/2004 | McComas | 250/399 |
| 6,835,927 | B1 | 12/2004 | Becker et al. | |
| 2001/0041357 | A1 | 11/2001 | Fouillet et al. | |
| 2002/0138208 | A1 | 9/2002 | Paulse et al. | |
| 2002/0193950 | A1 | 12/2002 | Gavin et al. | |
| 2003/0055573 | A1 | 3/2003 | Le Gore et al. | |
| 2003/0078739 | A1 | 4/2003 | Norton et al. | |
| 2003/0111596 | A1 | 6/2003 | Becker et al. | |
| 2003/0129760 | A1 | 7/2003 | Aguilera et al. | |
| 2003/0132114 | A1 | 7/2003 | Mischak et al. | |
| 2003/0172043 | A1 | 9/2003 | Guyon et al. | |
| 2003/0224531 | A1 | 12/2003 | Brennan et al. | |
| 2004/0053333 | A1 | 3/2004 | Hitt et al. | |

FOREIGN PATENT DOCUMENTS

| | | |
|---|---|---|
| WO | WO 01/31579 | 5/2001 |
| WO | WO-2003/031031 A1 | 4/2003 |
| WO | WO 03/089937 | 10/2003 |
| WO | WO- 2004/049385 A2 | 6/2004 |
| WO | WO- 2004/061407 A2 | 7/2004 |
| WO | WO- 2004/063215 A2 | 7/2004 |

OTHER PUBLICATIONS

Efron, Bradley et al., "Cross-validation and the bootstrap: estimating the error rate of a prediction rule", *Stanford University Technical Report* (May 1995), 1-28.

Efron, Bradley et al., "Estimating the error rate of a prediction rule: improvement on cross-validation". *Journal of American Statistical Association* (Jun. 1983), 78(382):316-331.

Stone, M, "Cross-validatory choice and assessment of statistical predictions". *Journal of the Royal Statistical Society* (1974), 36(2):111-147.

Adam, Bao-Ling, et al. "Serum protein fingerprinting coupled with a pattern-matching algorithm distinguishes prostate cancer from benign prostate hyperplasia and healthy men". *Cancer Research*, (2002) 62:3609-3614.

Bertero, M., "Linear inverse and ill-posed problems". *In Advances in Electronics and Electronic Physics. Academic Press*, (1989), NY.

Donoho, D.L. "Nonlinear solution of linear inverse problems by wavelet-vaguelette decomposition". *App. and Comp. Harmonic Analysis*, (1995), 2:101-126.

Donoho, D. L. "Unconditional bases are optimal bases for data compression and for statistical estimation". *Applied and Computational Harmonic Analysis*, (1993), 1(1):100-115.

Donoho, D. L., et al. Adapting to unknown smoothness via wavelet shrinkage. "*Journal of the American Statistical Association*", (1995), 90(432):1200-1224.

Guyon, I, et al. "An introduction to variable and feature selection". JMLR, (2003), 1:1-48.

Kalifa, Jerome, et al. "Minimax Deconvolution in Mirror Wavelet Bases". *IEEE Trans. on Image Processing* . (1999), 1-30.

Kalifa, Jerome, et al. "Thresholding Estimators for Linear Inverse Problems and Deconvolutions". *Annals of Statistics* (2003), No. 1, 58-109.

Petricoin III, E. F., et al., "Serum proteomic patterns for detection of prostate cancer". JNCI, (2002), 94(20):1576-1578.

Petricoin III, E. F., et al., "Use of proteomic patterns in serum to identify ovarian cancer". *The Lancet*, (2002), 359:572-577.

Strand, O. N. "Theory and methods related to the singular function expansion and landweber's iteration for integral equations of the first kind". *SIAM J. Num. Anal.,* (1973), 5.

Strittmatter, E. F., et al., "High mass measurement accuracy determination for proteomics using multivariate regression fitting: application to electrospray ionization time-of-flight mass spectrometry". *Anal. Chem.* , (2003), 75(3):460-468.

Tibshirani, Robert "Regression shrinkage and selection via the lasso". *J. Royal Statist. Soc* ., (1996), 58:267-288.

Tikhonov, A. N. "Solution of incorrectly formulated problems and the regularization method". *Soviet Math* . Doklady, (1963), 4:1035-1038.

Vestal, M., et al. "Resolution and Mass Accuracy in Matrix-Assisted Laser Desorption Ionization-Time-of-Flight", *J. A. Soc. Mass Spectrom.*, (1998), 9, 892-911.

Wehofsky, M., et al. "Isotopic deconvolution of matrix-assisted laser desorption/ionization mass spectra for substance class specific analysis of complex samples", (2001), 7:39-46.

Wehofsky, M., et al. "Automated deconvolution and deisotoping of electrospray mass spectra". *J. Mass Spectrom.*, (2002), 37(2):223-229.

Atomic decomposition by basis pursuit. SIAM Journal of Scientific Computing, (1988), 20(1):33-61.

Kolaczyk, E.D., et al., "Nonparametric Estimation of Gamma-Ray Burst Intensities Using HAAR Wavelets," *The Astrophysical Journal* (1997) vol. 483, pp. 340-349.

LI, E., et al., "Parametric Deconvoluation of Positive Spike Trains, "*The annals of Statistics* (2000) vol. 28, No. 5, 1279-1301.

*Mosaiques Diagonostics —Technology and Research*, www.Mosaiques-diagonostics.com, (2003) pp. 1-4.

Ahmed, et al. U.S. Appl. No. 10/846,996 entitled "A Method for Signal Processing electrospray ionized Time-if-Flight Mass Spectra to Obtain Noiseless Neutral Mass Spectra," filed on May 13, 2004 (WSGR Referance No. 29191-718.201).

* cited by examiner

METHOD AND APPARATUS FOR MODELING MASS SPECTROMETER LINESHAPES

BACKGROUND OF THE INVENTION

Mass spectrometry can be applied to the search for significant signatures that characterize and diagnose diseases. These signatures can be useful for the clinical management of disease and/or the drug development process for novel therapeutics. Some areas of clinical management include detection, diagnosis and prognosis. More accurate diagnostics may be capable of detecting diseases at earlier stages.

A mass spectrometer can histogram a number of particles by mass. Time-of-flight mass spectrometers, which can include an ionization source, a mass analyzer, and a detector, can histogram ion gases by mass-to-charge ratio. Time-of-flight instruments typically put the gas through a uniform electric field for a fixed distance. Regardless of mass or charge all molecules of the gas pick up the same kinetic energy. The gas floats through an electric-field-free region of a fixed length. Since lighter masses have higher velocities than heavier masses given the same kinetic energy, a good separation of the time of arrival of the different masses will be observed. A histogram can be prepared for the time-of-flight of particles in the field free region, determined by mass-to-charge ratio.

Mass spectrometry with and without separations of serum samples produces large datasets. Analysis of these data sets can lead to biostate profiles, which are informative and accurate descriptions of biological state, and can be useful for clinical decisionmaking. Large biological datasets usually contain noise as well as many irrelevant data dimensions that may lead to the discovery of poor patterns.

When analyzing a complex mixture, such as serum, that probably contains many thousands of proteins, the resulting spectral peaks show perhaps a mere hundred proteins. Also, with a large number of molecular species and a mass spectrometer with a finite resolution, the signal peaks from different molecular species can overlap. Overlapping signal peaks make different molecular species harder to differentiate, or even indistinguishable. Typical mass spectrometers can measure approximately 5% of the ionized protein molecules in a sample.

Performing analysis on raw data can be problematic, leading to unprincipled analysis of both data points and peaks. Raw data analysis can treat each data point as an independent entity. However, the intensity at a data point may be due to overlapping peaks from several molecular species. Adjacent data points can have correlated intensities, rather than independent intensities. Ad hoc peak picking involves identifying peaks in a spectrum of raw data and collapsing each peak into a single data point.

Mass spectra of simple mixtures, such as some purified proteins, can be resolved relatively easily, and peak heights in such spectra can contain sufficient information to analyze the abundance of species detected by the mass spectrometer (which is proportional to the concentration of the species in the gas-phase ion mixture). However, the mass spectra of sera or other complex mixtures can be more problematic. A complex mixture can contain many species within a small mass-to-charge window. The intensity value at any given data point may have contributions from a number of overlapping peaks from different species. Overlapping peaks can cause difficulties with accurate mass measurements, and can hide differences in mass spectra from one sample to the next. Accurate modeling of the lineshapes, or shapes of the peaks, can enhance the reliability and accurate analysis of mass spectra of complex biological mixtures. Lineshape models, or models of the peaks can also be called modeled mass-to-charge distributions.

Signal processing can aid the discovery of significant patterns from the large volume of datasets produced by separations-mass spectrometry. Mass spectral signal processing can address the resolution problem inherent in mass spectra of complex mixtures. Pattern discovery can be enhanced from signal processing techniques that remove noise, remove irrelevant information and/or reduce variance. In one application, these methods can discover preliminary biostate profiles from proteomics or other studies.

Therefore, it is desirable to reduce the noise and/or dimensionality of datasets, improve the sensitivity of mass spectrometry, and/or process the raw data generated by mass spectrometry to improve tasks such as pattern recognition.

BRIEF SUMMARY OF THE INVENTION

In some embodiments, molecules can be represented with a modeled mass-to-charge distribution detected by a mass spectrometer. The modeled mass-to-charge distribution can be based on a modeled initial distribution representing the molecules prior to traveling in the mass spectrometer. The modeled initial distribution can represent the molecules as having multiple positions and/or multiple energies and/or other initial parameters including ionization, position focusing, extraction source shape, fringe effects of electric fields, and/or electronic hardware artifacts. The modeled mass-to-charge distribution of the molecules and an empirical mass-to-charge distribution of the molecules can be compared.

In some embodiments, molecules can be represented by an analytic expression of a modeled mass-to-charge distribution detected by a mass spectrometer. The modeled mass-to-charge distribution can be based on a modeled initial distribution representing molecules prior to traveling in the mass spectrometer. The modeled initial distribution can represent the molecules as having multiple positions and/or multiple energies and/or other initial parameters including ionization, position focusing, extraction source shape, fringe effects of electric fields, and/or electronic hardware artifacts.

DETAILED DESCRIPTION OF THE INVENTION

Figure 1:
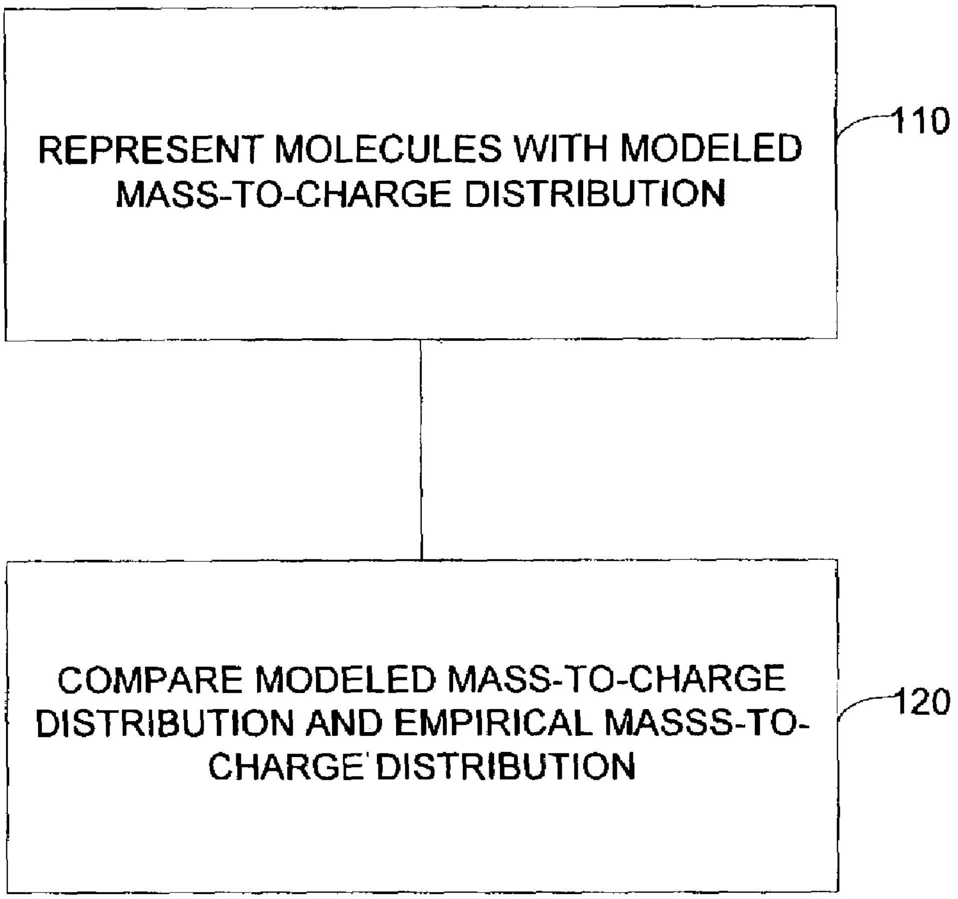
FIG. 1 is a flowchart illustrating one embodiment of performing signal processing on a mass spectrum.

The number of samples can be quite small relative to the number of data dimensions. For example, disease studies can include, in one case, on the order of $10^2$ patients and $10^9$ data dimensions per sample.

To lessen the computational burden of pattern recognition algorithms and improve estimation of the significance of a given pattern better, dimensionality reduction can be performed on the mass spectrometry data. Signal processing can ensure that processed data contains as little noise and irrelevant information as possible. This increases the likelihood that the biostate profiles discovered by the pattern recognition algorithms are statistically significant and are not obtained purely by chance.

Dimensionality reduction techniques can reduce the scope of the problem. An important tool of dimensionality reduction is the analysis of lineshapes, which are the shapes of peaks in a mass spectrum.

Lineshapes, instead of individual data points, can be interpreted in a physically meaningful way. The physics of the mass spectrometer can be used to derive mathematical models of mass spectrometry lineshapes. Ions traveling through mass spectrometers have well-defined statistical behavior, which can be modeled with probability distributions that describe lineshapes. The modeled lineshapes can represent the distribution of the time-of-flight for a given mass/charge (m/z), given factors such as the initial conditions of the ions and instrument configurations.

For specific mass spectrometer configurations, equations are derived for the flight time of an ion given its initial velocity and position. Next, a probability distribution is assumed of initial positions and/or velocities and/or other initial parameters that affect the time-of-flight based on rigorous statistical mechanical approximation techniques and/or distributions such as gaussians. Formulae are then calculated for the time-of-flight probability distributions that result from the probability-theoretical technique of "pushing forward" the initial position and/or velocity distributions by the time-of-flight equations. Each formula obtained can describe the lineshape for a mass-to-charge species.

A complex spectrum can be modeled as a mixture of such lineshapes. Using the modeled lineshapes, real spectrometric raw data of an observed mass spectrum can be deconvolved into a more informative description. The modeled lineshapes can be fitted to spectra, and/or residual error minimization techniques can be used, such as optimization algorithms with L2 and/or L1 penalties. Coefficients can be obtained that describe the components of the deconvolved spectrum.

Thus, data dimensions that describe a given peak can be collapsed into a simpler record that gives, for example, the center of the peak and the total intensity of the peak. In some cases, a broad peak in a spectrum can be replaced with much less data, which can be several m/z data points or a single m/z data point that represents the observed component's abundance in the spectrometer, which in turn is correlated with the abundance of the observed component in the original sample.

Filtering techniques (e.g., hard thresholding, soft thresholding and/or nonlinear thresholding) can be performed to de-noise and/or compress data. The processed data, with noise removed and/or having reduced dimensionality, can be one or more orders of magnitude smaller than the original raw dataset. Thus, the original raw dataset can be decomposed into chemically meaningful elements, despite the artifacts and broadening introduced by the mass spectrometer. Even in instances where peaks overlap such that they are visually indiscernible, this method can be applied to decompose the spectrum. The processed data may be roughly physically interpretable and can be much better suited for pattern recognition, due to the significantly less noise, fewer data dimensions, and/or more meaningful representation of charged states, isotopes of particular proteins, and/or chemical elements, that relate to the abundance of different molecular species.

When applied to processed data, such pattern recognition methods identify proteins which may be indicative of disease, and/or aid in the diagnosis of disease in people and quantify their significance. Finding the proteins and/or making a disease diagnosis can be based at least partly on the modeled mass-to-charge distribution.

FIG. 1 is a flowchart illustrating one embodiment of performing signal processing on a mass spectrum. In 110, a modeled mass-to-charge distribution represents molecules that have traveled through a mass spectrometer. The modeled mass-to-charge distribution is based on at least a modeled initial distribution of any parameter affecting time-of-flight representing the molecules prior to traveling in the mass spectrometer. In 120, the modeled mass-to-charge distribution is compared with an empirical mass-to-charge distribution. Various embodiments can add, delete, combine, rearrange, and/or modify parts of this flowchart.

Figure 2:
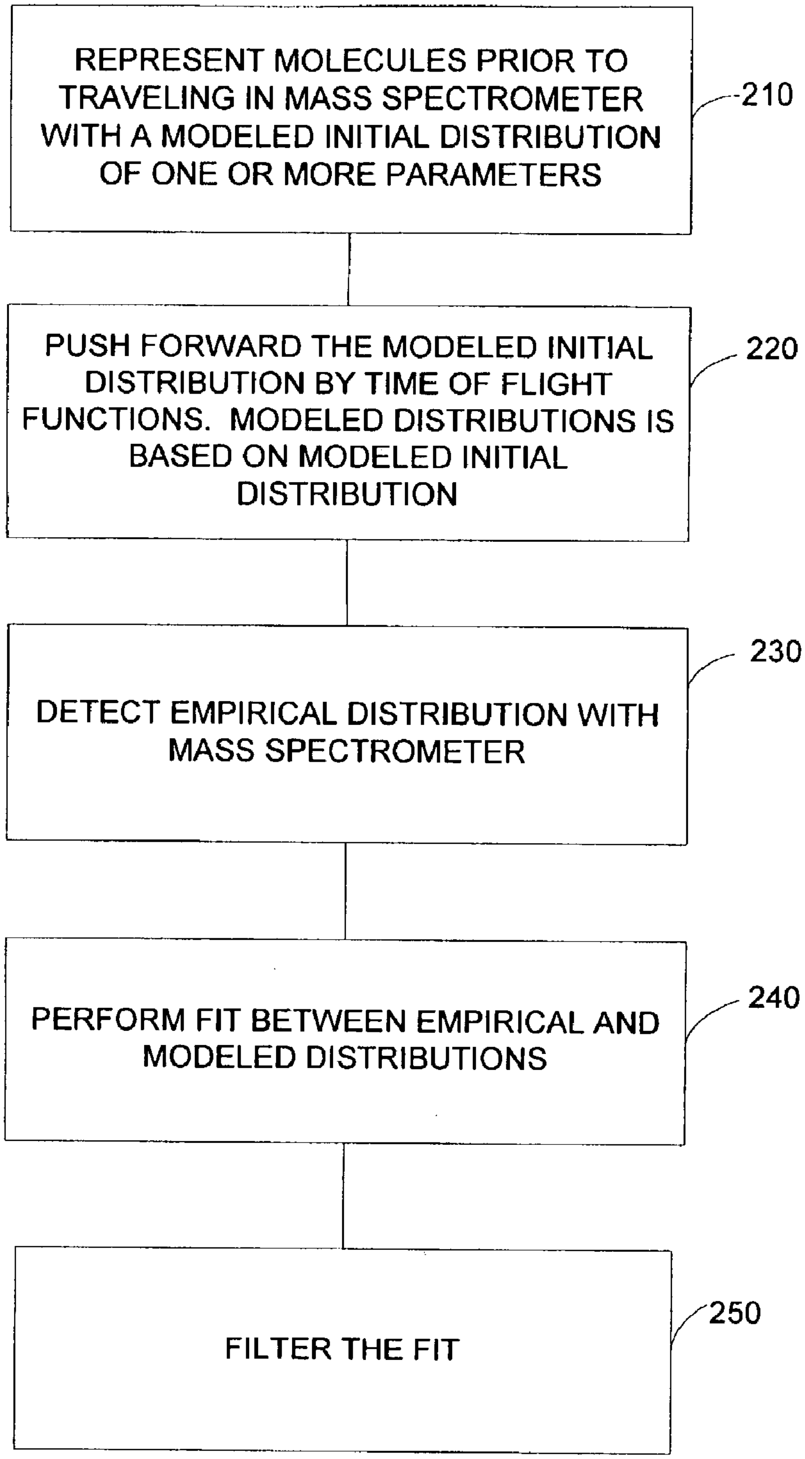
FIG. 2 is a flowchart illustrating aspects of some embodiments of performing signal processing on a mass spectrum.

FIG. 2 is a flowchart illustrating aspects of some embodiments of performing signal processing on a mass spectrum. In 210, a modeled initial distribution of one or more parameters affecting time-of-flight represents molecules prior to traveling in the mass spectrometer. In 220, the modeled initial distribution is pushed forward by time of flight functions. The modeled distribution is thereby based at least partly on the modeled initial distribution. In 230, a mass spectrometer detects an empirical distribution of molecules. This empirical distribution and the modeled distribution can be compared. In 240, a fit is performed between the empirical and modeled distributions. In 250, the fit is filtered. Various embodiments can add, delete, combine, rearrange, and/or modify parts of this flowchart.

Simple Mass Spectrometer Analyzer Configuration

Figure 3:
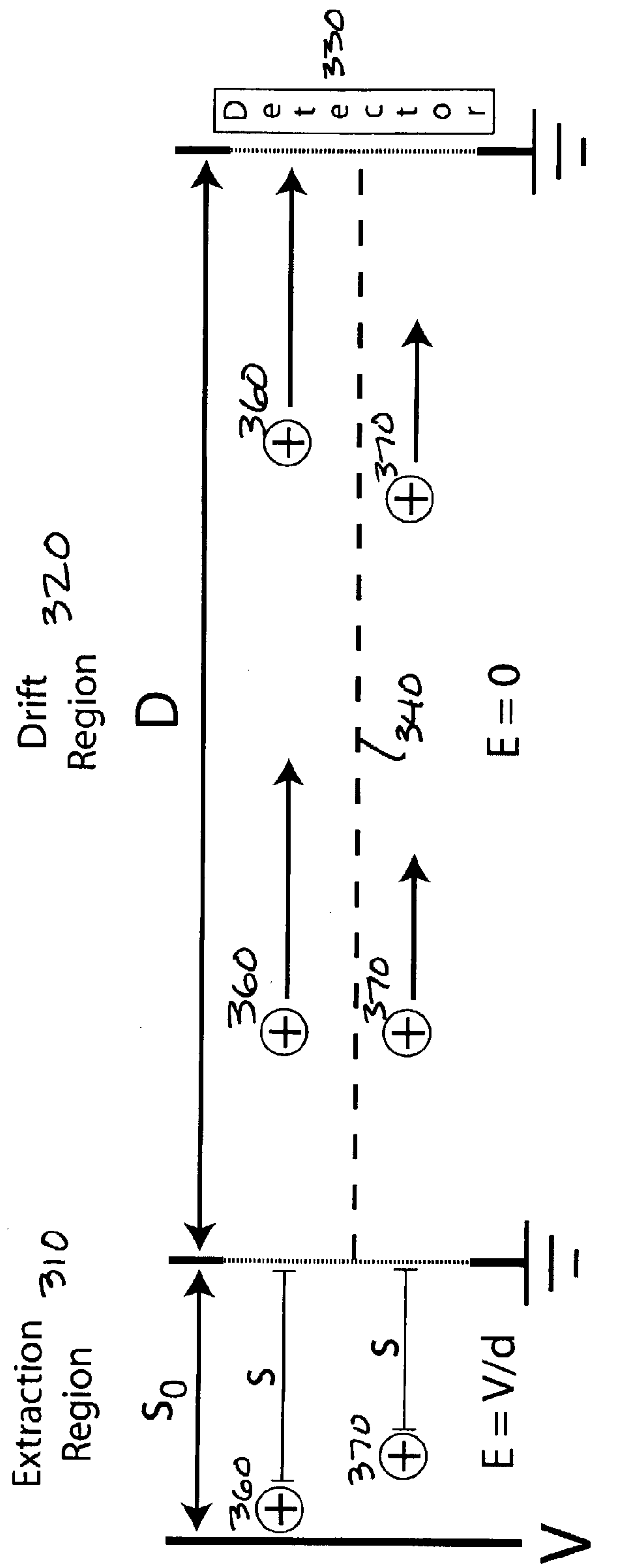
FIG. 3 is a simple schematic of a time-of-flight mass spectrometer.

FIG. 3 illustrates a simple schematic of a time-of-flight mass spectrometer. In a simple case, the mass analyzer has two chambers: the extraction region 310 and the drift region 320 (also called the field-free region), at the end of which is the detector 330. The flight axis 340 extends from the extraction chamber to the detector. One example of the effect of location in the extraction region on the time-of-flight of an ion is illustrated. Ion 360 is closer to the back of the extraction chamber than ion 370. Ion 360 is accelerated for a longer time in the extraction region 310 than ion 370. Ion 360 exits the extraction region 310 with a higher velocity than ion 370. Thus ion 360 reaches the detector 330 before ion 370.

Figure 4:
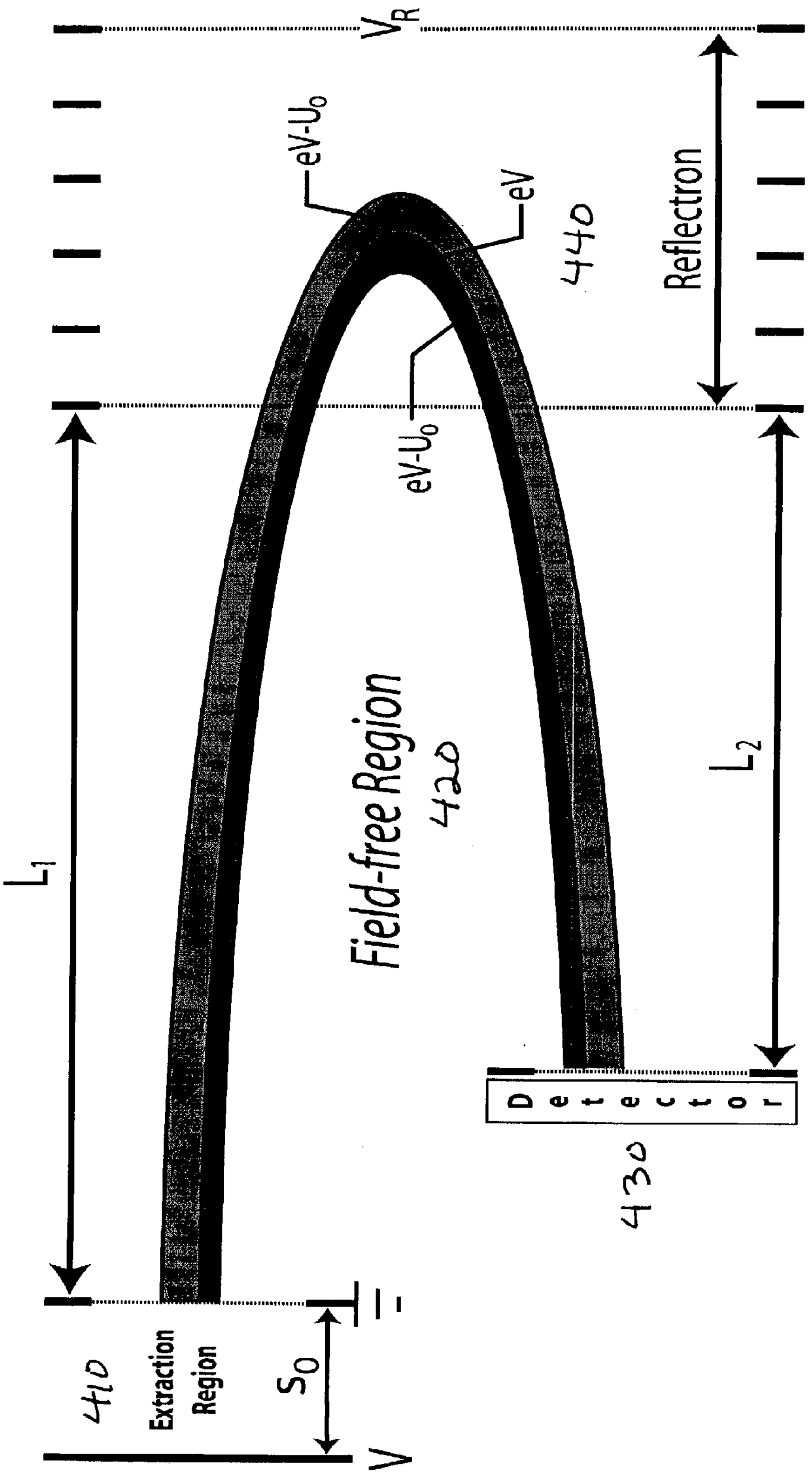
FIG. 4 is a simple schematic of a time-of-flight mass spectrometer with a reflectron.

FIG. 4 illustrates a simple schematic of a time-of-flight mass spectrometer with a reflectron. In addition to the extraction region 410, the drift region 420, and the detector 430, a reflectron 440 helps to lengthen the drift region 420 and focus the ions.

In some embodiments, the full gas content is completely localized in the extraction chamber with negligible kinetic energy in the direction of the flight axis. Other embodiments permit the gas tohave some kinetic energy in the direction of the flight axis, and/or have some kinetic energy away from the direction of the flight axis. In another embodiment, the gas ions have an initial spatial distribution within the extraction source. In yet another embodiment, the gas ions have an initial spatial distribution within the extraction source and have some kinetic energy in the direction of the flight axis, and/or have some kinetic energy away from the direction of the flight axis.

In an ideal case, an extraction chamber has a potentially pulsed uniform electric field $E_0$ in the direction of the flight axis, and has length $s_0$. An ion of mass m and charge q that starts at the back of the extraction chamber will pick up kinetic energy $E_0 s_0 q$ while traveling through the electric field. Suppose the field-free region has length D. If the ion has constant energy while in the field-free region, then:

$$\frac{1}{2}mv^2 = E_0 s_0 q \tag{1}$$

Other embodiments model an extraction chamber with a uniform electric field in a direction other than the flight axis, and/or an electric field that is at least partly nonuniform and/or at least partly time dependent.

If $t_D$ is the time-of-flight in the field-free region, and $v=D/t_D$ then:

$$t_D = D\sqrt{\frac{m}{2E_0 s_0 q}} \tag{2}$$

If not only the time-of-flight in the drift-free region is of interest, but the time spent in the extraction region as well, the velocity can be a function of distance traveled (from the energy gained). If u is the distance traveled, then $$v(u) = \sqrt{\frac{2E_0 uq}{m}}.$$

Both sides of $dt=du/v(u)$ are integrated:

$$t_{ext} = \int_0^{s_0} \sqrt{\frac{m}{2E_0 uq}}\,du = \sqrt{\frac{m}{2E_0 s_0 q}} \cdot 2s_0.$$

So the total time-of-flight is $t_{tot}=t_{ext}+t_D$:

$$t_{tot} = (D + 2s_0)\sqrt{\frac{m}{2E_0 s_0 q}} \tag{3}$$

Analogous equations can be derived to represent the ions as they move through other regions of a mass spectrometer.

With real world conditions, errors in the mass spectrum histogram can be seen, and the time-of-flight of a given species of mass-to-charge can have a distribution with large variance. This can be measured by widths at half-maximum height of peaks that are observed, to generate resolution statistics. The resolution of a given mass-to-charge is $m/\delta m$ (where m represents mass-to-charge m/q of equation (3) and where "$\delta m$" refers to the width at the half-maximum height of the peak).

Some factors that affect the time-of-flight distributions of a given mass-to-charge species are the initial spatial distribution within the extraction chamber, and the initial kinetic energy (alternatively, initial velocity) distribution in the flight-axis direction, and/or other initial parameters including ionization, position focusing, extraction source shape, fringe effects of electric fields, and/or electronic hardware artifacts. Other embodiments can represent the initial kinetic energy (alternatively initial velocity) distribution in a direction other than the flight-axis direction.

Choosing Initial Distributions of Species

The initial distributions of parameters of an ion species that affect the time-of-flight pushed forward by the time of flight functions can be called modeled initial distributions.

Some embodiments use distributions such as gaussian distributions of initial positions and/or energies (alternatively velocities).

Other embodiments can use various parametric distributions of initial positions and/or energies. The parameters can result from data fitting and/or by scientific heuristics. Further embodiments rely on statistical mechanical models of ion gases or statistical mechanical models of parameters that affect the time-of-flight. In many cases, the quantity of material in the extraction region is in the pico-molar range ($10^{-12}$ moles is on the order of $10^{11}$ particles) and hence statistics are reliable. An issue is the timescale for the system to reach equilibrium. In some embodiments, equilibrium statistical mechanics can apply if the system converges to equilibrium faster than, e.g. the microsecond range.

Model of Species Distributed in Position

Some embodiments have a parametric model of the initial position distribution and with a fixed initial energy. The time-of-flight distribution to be observed can be modeled. Let S be a normal random variable with mean $s_0$ and variance $\sigma_o^2 \ll s_0$. In the following calculations, the distribution of the time-of-flight in the field-free region ($t_D$) is modeled rather than the total time-of-flight ($t_{tot}$). Other embodiments can model the total time-of-flight, or in the field regions such as constant field regions.

From (2) the time-of-flight can be a random variable $t_D(S)$ and what will be observed in the mass spectrum is the probability density function of $t_D(S)$. The peak shape is the density of the push-forward of $N(s_0, \sigma_o^2)$ measured under the map $t_D$: $R \to R$. From probability theory, if $U=h(X)$ and $h(x)$ is either increasing or decreasing, then the probability density functions $p_U(u)$ and $p_U(u)=p_S(s)$ are related by $$p_U(u) = p_S(h^{-1}(u))\left|\frac{d(h^{-1}(u))}{du}\right| \tag{4}$$

In some embodiments, this can be a strictly decreasing function; other embodiments have an increasing function. To simplify notation, let $t_D=\psi$ and $Z=\psi(S)$. A constant is defined:

$$K = D\sqrt{\frac{m}{2E_o q}}.$$

From above, the probability density functions $P_Z(z)$ and $p_S(s)$ are related by $$p_Z(z) = p_S(\psi^{-1}(z))\left|\frac{d(\psi^{-1}(z))}{dz}\right|$$

Solving for $\psi^{-1}(z)$ and $$\frac{d(\psi^{-1}(z))}{dz}$$

gives $$\psi^{-1}(z)=\frac{K^2}{z^2}\text{ and }\frac{d(\psi^{-1}(z))}{dz}=\frac{-2K^2}{z^3}.$$

In embodiments where the probability density function $p_S(s)$ is gaussian then:

$$p_s(s)=\frac{1}{\sqrt{2\pi}\,\sigma_0}\exp\left[-\frac{(s-s_0)^2}{2\sigma_o^2}\right]$$

which gives $$p_Z(z)=\frac{1}{\sqrt{2\pi}\,\sigma_0}\left|\frac{-2K^2}{z^3}\right|\exp\left[\left(\frac{-1}{2\sigma_o^2}\right)\left(\frac{K^2}{z^2}-s_o\right)^2\right],$$

for $$\frac{K}{\sqrt{2s_o}}\leq z<\infty$$

and has a maximum $$z=\frac{K}{\sqrt{s_o}}=D\sqrt{\frac{m}{2E_os_oq}}.$$

By pushing forward a gaussian distribution for the spatial distribution, a skewed gaussian for $t_D(s)$ is obtained.

Figure 5:
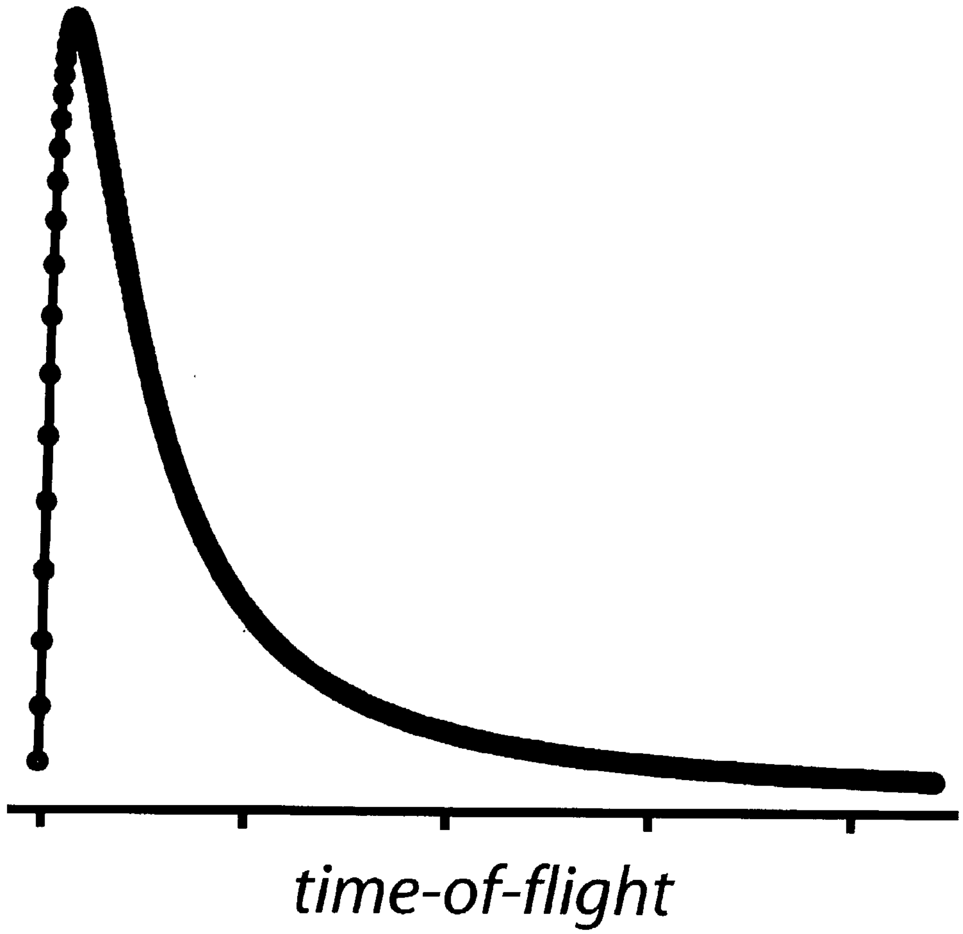
FIG. 5 illustrates a probability density function of a pushed forward Gaussian, showing a skew to the right.

FIG. 5 shows a probability density function $p_Z(z)$ of ions with m/z=2000 and a gaussian spatial distribution $N(s_0, \sigma_o^2)$ where $\sigma_o=s_o$. A clear skew to the right is shown.

Thus, is possible to calculate and/or at least analytically approximate the probability density function of time-of-flight as a function of random variables representing the initial position and/or energy distributions. Some embodiments model simple analyzer configurations such as a single extraction region with a field and a field-free region. Other embodiments model more complicated analyzer configurations.

Model of Species Distributed in Energy

In some embodiments, the initial position is constant but the initial kinetic energy in the flight axis-direction has a gaussian distribution.

In one case, the initial distribution can be given by a $N(U_0, \sigma_0^2)$ random variable U. The time-of-flight in the drift region is given by $$t_D(u)=\psi(u)=\frac{D\sqrt{2m}}{2\sqrt{U+K}},$$

where

-continued $$K=qE_0s_0.$$

Then $$\psi^{-1}(t)=\frac{mD^2}{2t^2}-K,$$

and $$\frac{d}{dt}\psi^{-1}(t)=-\frac{mD^2}{t^3}.$$

The probability distribution of the time-of-flight $Z=\psi(U)$ is $$p_Z(z)=\frac{1}{\sqrt{2\pi}\,\sigma_0}\frac{mD^2}{z^3}\exp\left(-\frac{1}{2\sigma_0^2}\left\{\frac{mD^2}{2z^2}-K-U_0\right\}^2\right). \tag{5}$$

Another Model of Species Distributed in Position

If y denotes the initial distance of an ion from the beginning of the field-free region ($0\leqq y\leqq S$), and $$K=\frac{2qeE_0}{m}$$

where e is the charge of an electron in Coulombs q is the integer charge of the ion m is the mass of the ion $E_0$ is the electric field strength of the extraction region then the time-of-flight is $$t_{tof}=t_{ext}+t_D \tag{6}$$

where $t_{tof}$ is the time-of-flight, $t_{ext}$ is the time the ion spends in the extraction chamber, and $t_D$ is the time the ion spends in the field-free region. We can show that:

$$t_D=\frac{D}{\sqrt{Ky}}$$

and $$t_{ext}=\int_0^y\frac{ds}{v(s)}=\frac{2\sqrt{y}}{\sqrt{K}}$$

Combining the above two terms gives $t_{tof}$:

$$t_{tof}=\frac{1}{\sqrt{Ky}}(2y+D) \tag{7}$$

We suppose that the random variable Y, representing initial position is distributed as $$Y\sim N(\nu, \tau^2).$$

If $t_{tof}=F(y)$, then we need to find $y=F^{-1}(t)$. To this end, equation 7 can be rewritten as:

$$\sqrt{Ky}\,t=2y+D$$

Substituting $z^2=y$, gives:

$$2z^2-\sqrt{K}tz+D=0$$

$$4z=-\sqrt{K}t\pm\sqrt{Kt^2-8D}$$

$$16z^2=2Kt^2-8D\mp 2\sqrt{K}t\sqrt{Kt^2-8D}$$

Substituting back in y $$y=\frac{2Kt^2-8D\mp 2\sqrt{K}\,t\sqrt{Kt^2-8D}}{16} \tag{8}$$

Of these two solutions, for physical reasons, the solution with the minus sign can be chosen.

Let $\psi(t)=F^{-1}(t)$ and find the derivative with respect to t $$4\frac{d\psi(t)}{dt}=Kt-\frac{K^2t^2-4DK}{\sqrt{K^2t^2-8KD}} \tag{9}$$

$$4\frac{d\psi(t)}{dt}=Kt-\frac{K^2t^2-4DK}{\sqrt{K^2t^2-8KD}}$$

From equations 8 and 9, the push forward can be calculated as $$p_T(t)=\frac{|\psi'(t)|}{\tau\sqrt{2\pi}}\exp\left(-\frac{(\psi(t)-v)^2}{2\tau^2}\right) \tag{10}$$

Another Model of Species Distributed in Energy

The push forward for the case with an initial energy distribution can be calculated. Suppose that the random variable X, representing initial velocity, is distributed as $$X\sim N(\mu,\sigma^2)$$

$$t_D=\frac{D}{\sqrt{x^2+KS}}$$

$$t_{ext}=\frac{2}{K}\left(\sqrt{x^2-KS}-x\right).$$

Combining these terms gives an expression for $t_{tof}$:

$$t_{tof}=\frac{D}{\sqrt{x^2+KS}}+\frac{2}{K}\left(\sqrt{x^2+KS}-x\right) \tag{6}$$

Substituting $u=\sqrt{x^2+KS}$:

$$2u+\frac{KD}{u}-2\sqrt{u^2-KS}-Kt=0$$

This can be written as a polynomial in u power 3.

$$4tu^3-(4s+4D+Kt^2)u^2+2KDtu-KD^2=0$$

Solving for u and letting $A=4(D+S)$ gives:

$$\frac{1}{12t}\left(A+Kt^2+\frac{A^2+2(A+12D)Kt^2+K^2t^4}{f(t)^{1/3}}+f(t)^{1/3}\right),$$

$$f(t)=A^3+3(A^2+12AD-72D^2)Kt^2+3(A+12D)K^2t^4+K^3t^6+$$
$$12\sqrt{3}\sqrt{D^2Kt^2(-A^3-4(A^2+9AD-27D^2)Kt^2-(5A+68D)K^2t^4-2K^3t^6)}$$

Now with $\psi(t)$, $\psi'(t)$ can also be calculated:

$$\psi'(t)=\frac{1}{12}t\left(2Kt+\frac{4(A+12D)Kt+4K^2t^3}{f(t)^{1/3}}+\right.$$
$$\left.\frac{1}{12}\left(A+f(t)^{1/3}+Kt^2+\frac{A^2+2(A+12D)Kt^2+K^2t^4}{f(t)^{1/3}}\right)\right)$$

Model of Combined Position and Energy

If v is the velocity at the start of the field-free region, then the time-of-flight in the field-free region is given by $$t_D=\frac{D}{v}$$

and the inverse by $$\psi(t)=-\frac{D}{t}$$

with derivative $$\psi'(t)=-\frac{D}{t^2}.$$

If $p_V(v)$ is the distribution of velocities at the start of the field-free region, then the corresponding time-of-flight distribution is $$p_T(t)=\frac{D}{t^2}p_v\left(\frac{D}{t}\right)$$

General mass spectrometer analyzer configurations with an arbitrary number of electric field regions and field-free regions Equations for calculating the time-of-flight of an ion through any system involving uniform electric fields can be derived from the laws of basic physics. Such equations can accurately determine the flight time as a function of the mass-to-charge ratio for any specific instrument, with distances, voltages and initial conditions. The accuracy of such calculations can be limited by uncertainties in the precise values of the input parameters and by the extent to which the simplified one-dimensional model accurately represents the real three-dimensional instrument. Other embodiments can use more than one-dimension, such as a two-dimensional, or a three-dimensional model.

Analyzers with electric fields can have at least two kinds of regions: field free regions, and constant field regions. Velocities of an ion can be traced at different regions to understand the time-of-flight. In an ideal field-free region of length L, an ion's initial and final velocities are the same and therefore the time spent in the region is $$t_{Free}=L/v_{final}=L/v_{initial}$$

In other embodiments that have nonideal field-free regions with changes in velocity in the field-free region, decelerations and/or accelerations can be accounted for in the time spent in the field-free region.

In a simple constant electric field region, the velocity changes but the acceleration is constant. Using this information, supposing the acceleration (that depends on mass) is a in a region of length L, the time of flight is $$t_{ConstantField} = v_{final}/a - V_{initial}/a.$$

In other embodiments that have nonideal constant electric field regions with nonconstant acceleration, deviations from constant acceleration can be accounted for in the time spent in the constant field region.

A general formula for total time-of-flight through regions with accelerations $a_1, \ldots, a_M$ is given by $$t = \sum_{k=1}^{M} t_k$$

where $$t_k = \begin{cases} v_k / a_k - v_{k-1} / a \\ L_k / v_{k-1} \end{cases}$$

The connection between $v_{k-1}$ and $v_k$ is given by conservation of energy.

$$v_k^2 - v_{k-1}^2 = \begin{cases} 0 \\ 2a_k L_k. \end{cases}$$

As a step towards simplification, note that $$\begin{aligned} \frac{v_k}{a_k} - \frac{v_{k-1}}{a_k} &= \frac{1}{a_k}(v_k - v_{k-1}) \\ &= \frac{1}{a_k}\frac{v_k^2 - v_{k-1}^2}{v_k + v_{k-1}} \\ &= \frac{1}{a_k}\frac{2a_k L_k}{v_k + v_{k-1}} \\ &= \frac{2L_k}{v_k + v_{k-1}}. \end{aligned}$$

This leads to a unified formula for total time-of-flight:

$$t = \sum_{k=1}^{M} \frac{2L_k}{v_k + v_{k-1}}$$

Next, a simple inductive argument shows $$v_k^2 = \sum_{j=1}^{k} 2a_j L_j + v_0^2.$$

Letting $$P_k = \sum_{j=1}^{k} 2a_j L_j,$$

we rewrite the time-of-flight formula as $$t = \sum_{k=1}^{M} \frac{2L_k}{\sqrt{P_k + v_0^2} + \sqrt{P_{k-1} + v_0^2}}. \tag{6}$$

If we collect the initial conditions $s_o$ and $v_o$ in one term $$I(s_0, v_0) = a_1 s_0 + v_0^2,$$

then it is clear that we have nonnegative constants $Q_1, \ldots, Q_M$ such that $$t = \psi(I) = \sum_{k=1}^{M} \frac{1}{\sqrt{Q_k + I} + \sqrt{Q_{k-1} + I}}.$$

Taking a derivative shows that this is a strictly decreasing function for I>0 and therefore has an inverse. The derivative of the inverse of this function is of interest, according to (4) such a term affects the pushforward density as a factor, and hence has a strong impact on the shape of the push-forward distribution.

Next is introduced a procedure for calculating the inverse $\psi^{-1}(t)$ of $\psi(I)$. It can be observed that if $$\sqrt{x+a} - \sqrt{x} = z$$

then $$x = \left(\frac{a - z^2}{2z}\right)^2.$$

If any of the $t_1, \ldots, t_M$, is known, then it would be easy to calculate I. In one approach, these $t_k$ can be backed out of in stages until t is exhausted. The system of quadratic equations includes the following: for each $1 \leqq k \leqq M$:

$$\left(\frac{a_k L_k - t_k^2}{2t_k}\right)^2 - Q_k = I,$$

with the constraint that the $t_k$ sum to t.

Linshapes of a Single-stage Reflectron Mass Spectrometer

Some embodiments can be applied to a mass spectrometer including three chambers and a detector—a ion extraction chamber (e.g. rectangular), a field-free drift tube, and a reflectron. The shape of the distribution of the time-of-flight of a single mass-to-charge species can be determined at least partly by the distributions of initial positions in the extraction chamber and/or the initial velocities along the flight-axis.

Approximate formulae can be derived for the time-of-flight distribution for a species of fixed mass-to-charge ratio, in this example assuming that the distributions for initial positions and velocities are gaussian. The initial positions have restricted range, and the assumption for initial position may be modified to reflect this.

The plane that separates the extraction region from the field-free drift region can be called the "drift start" plane. For a given ion the flight-axis velocity at the "drift start" plane can be referred to as the "drift start velocity."

Basic Formulae

If x denotes the initial velocity and y denotes the initial distance of an ion from the drift-start plane ($0 \leqq y \leqq S$), and $$K = \frac{2qeE_0}{m}$$

where e is the charge of an electron in Coulombs q is the integer charge of the ion m is the mass of the ion $E_o$ is the electric field strength of the extraction region then $$v(x, y) = \sqrt{x^2 + Ky}.$$

If an ion has drift-start velocity of v and if $L_1$ is the length of the drift region $L_2$ is the distance from the drift-end plane and the detector $$D = L_1 + L_2$$

$E_1$ is the electric field strength of the reflectron, and $a = qE_1/m$ is the acceleration of the ion in the reflectron then the time-of-flight of the ion is $$T(v) = \frac{D}{v} + 2\frac{v}{a}.$$

Given a distribution $p_{XY}$ in the (x, y)—space of initial velocities and positions, the probability density can be determined that results when this distribution is pushed forward by $$(x, y) \rightarrow v(x, y).$$

The resulting density in the space of velocities can be denoted by $p_V$. Next, T can be used to push forward the density $p_V$ to a new density in the t-space $$p_T = T^* p_V.$$

Expression for $p_V$ in the Gaussian Case

Suppose that the random variable X, representing initial velocity, and Y, representing initial position, are distributed as $$X \sim N(\mu, \sigma^2)$$

$$Y \sim N(\nu, \tau^2)$$

The push-forward of $p_{XY}$ under $$v(x, y) = \sqrt{x^2 + Ky}$$

can be given by integrating the measure $p_{XY}$ (x, y)dxdy over the fibers $$\text{Fiber}(v) = \{(x, y) : \sqrt{x^2 + Ky} = v\}.$$

Suppose F(x, y) is any function of x and y. Then $$E_{XY}[F] = \int_x \int_y F(x, y) p_{XY}(x, y) dx dy.$$

Change the variables to $z = \sqrt{Ky}$. Then $$dz = \frac{\sqrt{K}}{2\sqrt{y}} dy = \frac{K}{2\sqrt{Ky}} dy = \frac{K}{2z} dy.$$

Therefore, $$\frac{2z}{K} dz = dy.$$

So $$E_{XY}[F] = \int_x \int_{z=0}^{z=\sqrt{KS}} F\left(x, \frac{z^2}{K}\right) p_{XY}\left(x, \frac{z^2}{K}\right) \frac{2}{K} z dz dx.$$

Figure 6:
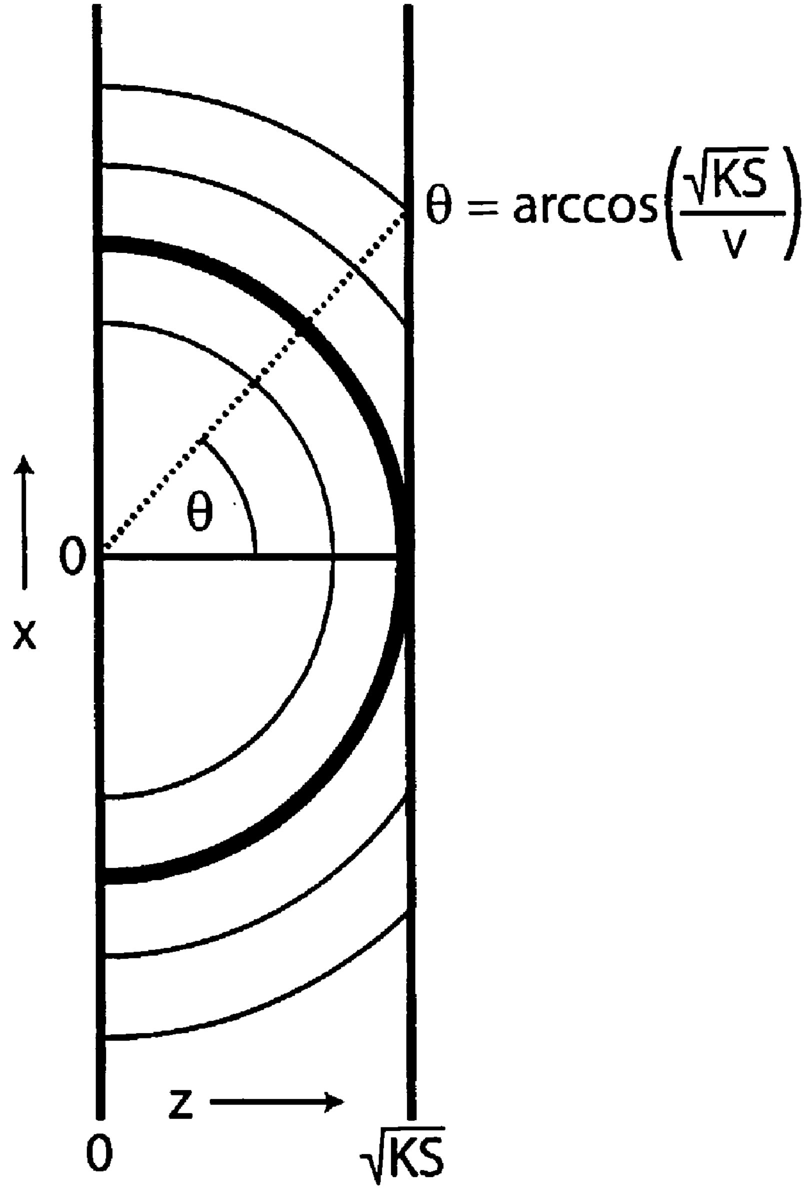
FIG. 6 shows a change of coordinates from $(x, z)$ to $(v, \theta)$

Now change to polar coordinates (v,θ). Care can be taken with the ranges of θ: when $v \leqq \sqrt{KS}$ the range of θ is [−π/2,π/2]; however, when $v > \sqrt{KS}$ the range can be broken into two symmetric parts that consist of $[\arccos(\sqrt{KS}/v), \pi/2]$ and its mirror image. Refer to FIG. 6.

Next, change to polar coordinates $z = v \cos\theta$ and $x = v \sin\theta$ without specifying the limits of θ to get $$\begin{aligned} E_{XY}[F] &= \int_v \int_\theta F\left(v\sin\theta, \frac{v^2}{K}\cos^2\theta\right) p_{XY}\left(v\sin\theta, \frac{v^2}{K}\cos^2\theta\right) \frac{2v}{k} \cos\theta v d\theta dv \\ &= \int_v \frac{2v^2}{K}\left(\int_\theta F\left(v\sin\theta, \frac{v^2}{K}\cos^2\theta\right) p_{XY}\left(v\sin\theta, \frac{v^2}{K}\cos^2\theta\right)\cos\theta d\theta\right) dv \end{aligned}$$

Make the change of variables $u = v \sin\theta$ so that the inner integral above becomes $$\frac{2}{K}\int_0^v F\left(u, \frac{(v^2 - u^2)}{K}\right) p_{XY}\left(u, \frac{(v^2 - u^2)}{K}\right) du$$

An expression for $p_V$ for $v \leqq \sqrt{KS}$ can be given by $$p_v(v) = \frac{4v}{K}\int_0^v p_{XY}\left(u, \frac{v^2 - u^2}{K}\right) du;$$

and for $v \geqq \sqrt{KS}$, the range of θ is $[\arccos(\sqrt{KS}/v), \pi/2]$ and change of variables to u yields the range $[\sqrt{v^2 - KS}, v]$ as clear from FIG. 6:

$$p_v(v) = \frac{4v}{K}\int_{\sqrt{v^2 - KS}}^v p_{XY}\left(u, \frac{v^2 - u^2}{K}\right) du.$$

Upper and lower bounds can be explored that lead to an approximation that has accurate decay as $v \to \infty$.

Approximation of Taylor expansion $$p_v(v) = \begin{cases} \frac{4v}{2\pi\sigma K\tau}\int_0^v e(u, v)du & v \le \sqrt{Ks} \\ \frac{4v}{2\pi\sigma K\tau}\int_{\sqrt{v^2-Ks}}^v e(u, v)du & \sqrt{Ks} \le v < \infty \end{cases}$$

where $$\begin{aligned} e(u, v) &= \exp\left\{-\frac{u^2}{2\sigma^2} - \frac{1}{2\tau^2}\left(\frac{v^2-u^2}{K} - v\right)^2\right\} \\ &= \exp\left\{-\frac{u^2}{2\sigma^2} - \frac{1}{2\tau^2K^2}(v^2-u^2-Kv)^2\right\} \\ &= \exp\left\{-\frac{u^2}{2\sigma^2} - \frac{1}{2\tau^2K^2}(u^2-v^2+Kv)^2\right\} \\ &= \exp\left\{-\frac{1}{2\tau^2K^2}\left[u^2\frac{\tau^2K^2}{\sigma^2} + (u^2-v^2+Kv)^2\right]\right\} \\ &= \exp\left\{-\frac{1}{2\tau^2K^2}\left[\left(v^2\frac{\tau^2K^2}{\sigma^2} - Kv\frac{\tau^2K^2}{\sigma^2}\right) + \right.\right. \\ &\qquad \left.\left.\left(\frac{\tau^2K^2}{\sigma^2}(u^2-v^2+Kv) + (u^2-v^2+Kv)^2\right)\right]\right\} \\ &= \exp\left\{-\frac{v^2}{2\sigma^2} + \frac{Kv}{2\sigma^2} + \frac{\tau^2K^2}{8\sigma^4}\right\}\exp\left\{-\frac{1}{2}\left(\frac{u^2}{\tau K} - \frac{v^2}{\tau K} + \frac{\tau K}{2\sigma^2} + \frac{v}{\tau}\right)^2\right\} \end{aligned}$$

Let $$\alpha = \frac{v^2}{\tau K} - \frac{\tau K}{2\sigma^2} - \frac{v}{\tau}$$

and $$A(v) = \exp\left(-\frac{v^2}{2\sigma^2} + \frac{Kv}{2\sigma^2} + \frac{\tau^2K^2}{8\sigma^4}\right)$$

$$p_v(v) = \begin{cases} \frac{4v}{2\pi\sigma K\tau}A(v)\int_0^v \exp\left\{-\frac{1}{2}\left(\frac{u^2}{\tau K} - \alpha\right)^2\right\}du & v \le \sqrt{Ks} \\ \frac{4v}{2\pi\sigma K\tau}A(v)\int_{\sqrt{v^2-Ks}}^v \exp\left\{-\frac{1}{2}\left(\frac{u^2}{\tau K} - \alpha\right)^2\right\}du & \sqrt{Ks} \le v < \infty \end{cases}$$

This last integral can be simplified using Taylor expansion. In this example, a five term expansion is used. Let $$G(x) = x\int_0^x \exp\left(-\frac{1}{2}(u^2 - x^2 - a)^2\right)du$$

Then $$xG(x) = e^{-\frac{1}{2}a^2}\left(x^2 - \frac{2}{3}ax^3 + \frac{16a^4 + 32a^2 - 32}{120}x^6\right).$$

Note that $$A(v)e^{-\frac{1}{2}a^2} = \exp\left(-\frac{v^2}{2\sigma^2} - \frac{v^2}{2\tau^2}\right).$$

Fitting Modeled Lineshapes to Empirically Observed Data

The mathematical forms derived above for the lineshapes, or shapes of peaks, of the different species based upon the underlying physics of the mass spectrometer, can be applied to the analysis of spectra. Rigorous fits can be performed between empirical mass spectra and synthetic mass spectra generated from mixtures of lineshapes.

A more complex method for fitting a mass spectrum using modeled lineshape equations uses model basis vectors, such as wavelets and/or vaguelettes. This can be done generally, and/or for a given mass spectrometer design. A basis set is a set of vectors (or sub-spectra), the combination of which can be used to model an observed spectrum. An expansion of the lineshape equations can derive a basis set that is very specific for a given mass spectrometer design.

A spectrum can be described using the basis vectors. An observed empirical spectrum can be described by a weighted sum of basis vectors, where each basis vector is weighted by multiplication by a coefficient.

Some embodiments use scaling. The linewidth of the peak corresponding to a species in a mass spectrum is dependent on the time-of-flight of the species. Thus, the linewidth in a mass spectrum may not be constant for all species. One way to address this is to rescale the spectrum such that the linewidths in the scaled spectrum are constant. Such a method can utilize the linewidth as a function of time-of-flight. This can be determined and/or be estimated analytically, empirically, and/or by simulation. Spectra with constant linewidth can be suitable for many signal processing techniques which may not apply to non-constant linewidth spectra.

Some embodiments use linear combinations and/or matched filtering. In one embodiment, a weighted sum of lineshape functions representing peaks of different species can be fitted to the observed signal by minimizing error. The post-processed data can include the resulting vector of weights, which can represent the abundance of species in the observed mass spectrum.

Fitting can assume that the spectrum has a fixed set of lineshape centers (including mass-to-charge values) $c_1, c_2, \ldots, c_N$ and a predetermined set of widths for each center $\sigma_1, \sigma_2, \ldots, \sigma_N$. A lineshape function such as $\lambda(c, \sigma, t)$ may be determined for each center-width pair. A synthetic spectrum may include a weighted sum of such lineshape functions:

$$S(t) = \sum_{i \le i \le N} w_i\lambda(c_i, \sigma_i, t).$$

A minimal error fit can be performed to calculate the parameters $w_1, \ldots, w_N$. The error function could be the squared error, or a penalized squared error.

One advantage of this method is that it reduces the number of data dimensions, since an observed spectrum with a large number of data points can be described by a few parameters. For example, if an observed spectrum has 20,000 data points, and 20 peaks, then the spectrum can be described by 60 points consisting of 20 triplets of center, width, and amplitude. The original 20,000 dimensions have been reduced to 60 dimensions.

Some embodiments construct convolution operators. Lineshapes constructed analytically, determined empirically, and/or determined by simulation may be used to approximate a convolution operator that replaces a delta peak (e.g., an ideal peak corresponding to the time-of-flight for a particular species) with the corresponding lineshape.

Some embodiments use Fourier transform deconvolution. The Fourier transform and/or numerical fast Fourier transform of a spectrum such as the rescaled spectrum can be multiplied by a suitable function of the Fourier transform of the lineshape determined analytically, estimated empirically, and/or by simulation. The inverse Fourier transform or inverse fast Fourier transform can be applied to the resulting signal to recover a deconvolved spectrum.

Some embodiments use scaling and wavelet filtering. Any family of wavelet bases can be chosen, and used to transform a spectrum, such as a rescaled spectrum. A constant linewidth of the spectrum can be used to choose the level of decomposition for approximation and/or thresholding. The wavelet coefficients can be used to describe the spectrum with reduced dimensions and reduced noise.

Some embodiments use blocking and wavelet filtering. The spectrum can be divided into blocks whose sizes can be determined by linewidths determined analytically, estimated empirically, and/or by simulation. Any family of wavelet bases can be chosen and used to transform a spectrum, such as the raw spectrum. Different width features can be described in the wavelet coefficients at different levels. The wavelet coefficients from the appropriate decomposition levels can be used to describe the spectrum with reduced dimensions and reduced noise.

Some embodiments construct new wavelet bases. Analytical lineshapes, empirically determined lineshapes, and/or simulated lineshapes for a given configuration of a mass spectrometer can be used to construct families of wavelets. These wavelets can then be used for filtering.

Vaguelettes are another choice for basis sets. The vaguelettes vectors can include vaguelettes derived from wavelet vectors, vaguelettes derived from modeled lineshapes, and/or vaguelettes derived from empirical lineshapes.

Some embodiments use wavelet-vaguelette decomposition. Another method based on wavelet filtering may be the wavelet-vaguelette decomposition. The modeled lineshape functions may be used to construct a convolution operator that replaces a delta peak with the corresponding lineshape. Any family of wavelet bases may be chosen, such as 'db4', 'symmlet', 'coiflet'. The convolution operator may be applied to the wavelet bases to construct a set of vaguelettes. A minimal error fit may be performed for the coefficients of the vaguelettes to the observed spectrum. The resulting coefficients may be used with the corresponding wavelet vectors to produce a deconvolved spectrum that represents abundances of species in the observed spectrum.

Some embodiments use thresholding estimators. Another method for deconvolving a rescaled spectrum is the use of the mirror wavelet bases. If the observed spectrum is $y=Gx+e$, and if H is the pseudo-inverse of G, and if $z=He$, then let K be the covariance of z. The Kalifa-Mallat mirror wavelet basis can guarantee that K is almost diagonal in that basis. The decomposition coefficients in this basis can be performed with, a wavelet packet filter bank requiring O(N) operations. These coefficients can be soft-thresholded with almost optimal denoising properties for the reconstructed synthetic spectra.

Fitting a basis set to an observed empirical spectrum does not necessarily reduce the dimensionality, or the number of data points needed to describe a spectrum. However, fitting the basis set "changes the basis" and does yield coefficients (parameters) that can be filtered more easily. If many of the coefficients of the basis vectors are close to zero, then the new representation is sparse, and only some of the new basis vectors contain most of the information.

In another example of filtering noise and reducing dimensionality, thresholding can be performed on the basis vector coefficients. These methods remove or deemphasize the lowest amplitude coefficients, leaving intensity values for only the true signals. Hard thresholding sets a minimum cutoff value, and throws out any peaks whose height is under that threshold; smaller peaks may be considered to be noise. Soft thresholding can scale the numbers and then threshold. Multiple thresholds and/or scales can be used.

Figure 7:
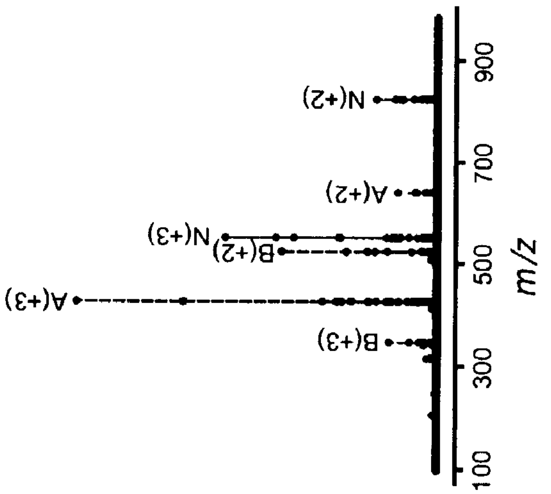
FIG. 7 shows a mass spectrum.
Figure 8:
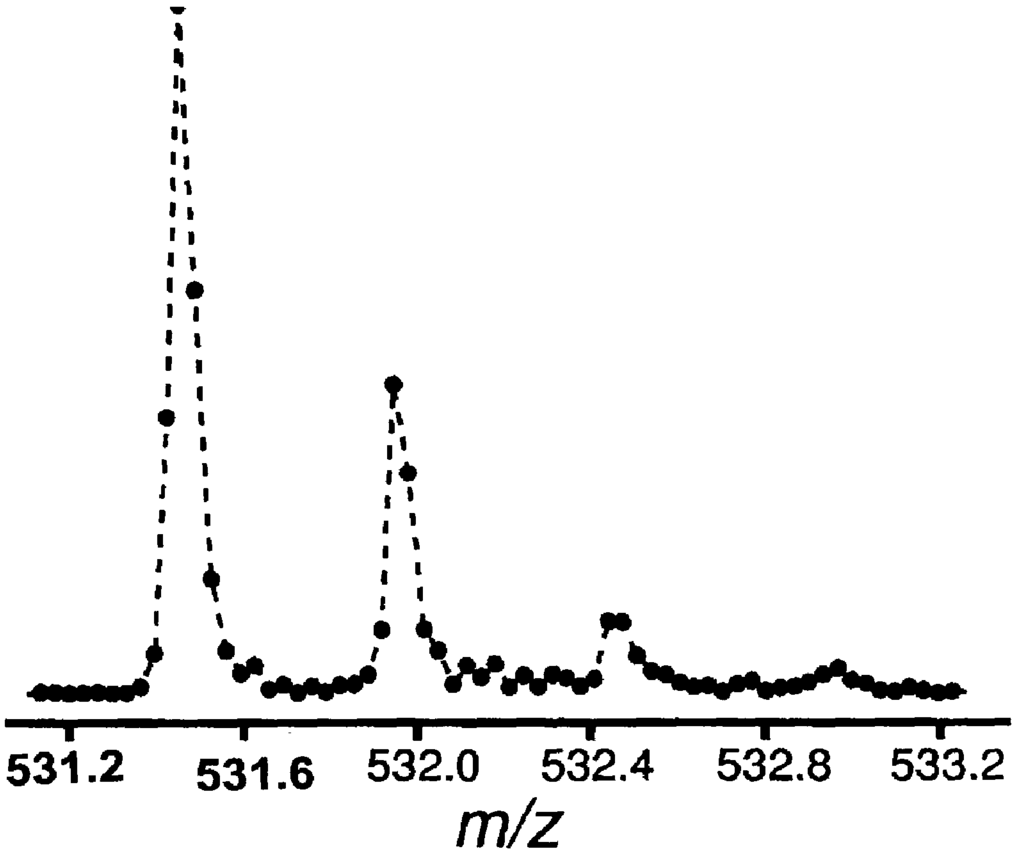
FIG. 8 shows an expanded view of FIG. 7.

FIGS. 7 and 8 are empirical figures that show that real mass spectra have lineshapes with a skewed shape consistent with the results of the pushed-forward lineshapes.

FIG. 7 illustrates a mass spectrum of a 3 peptide mixture of angiotensin (A), bradykinin (B), and neurotensin (N). Data were collected on an electro-spray-ionization time-of-flight mass spectrometer (ESI-TOF MS). For each peptide, there are two peaks, one for the +2 and +3 charge states. For example, A(+2) is the angiotensin +2 charge state.

FIG. 8 illustrates an expanded view of FIG. 7 to display in detail the bradykinin +2 charge state. The various peaks present are due to different isotope compositions of the bradykinin ions in the ensemble (e.g. 13C vs. 12C) By visual inspection, one can observe that the peakshapes are skewed to the right.

Conversion between time-of-flight and mass to charge is trivial. For example, in some cases mass-to-charge $(m/z)=2*(extraction\_voltage/flight\_distance^2)*time\text{-}of\text{-}flight^2$. Thus, a time-of-flight distribution can be considered an example of a mass-to-charge distribution.

Some embodiments can run on a computer cluster. Networked computers that perform CPU-intensive tasks in parallel can run many jobs in parallel. Daemons running on the computer nodes can accept jobs and notify a server node of each node's progress. A daemon running on the server node can accept results from the computer nodes and keep track of the results. A job control program can run on the server node to allow a user to submit jobs, check on their progress, and collect results. By running computer jobs that operate independently, and distributing necessary information to the computer nodes as a pre-computation, almost linear speed is gained in computation time as a function of the number of compute nodes used.

Other embodiments run on individual computers, supercomputers and/or networked computers that cooperate to a lesser or greater degree. The cluster can be loosely parallel, more like a simple network of individual computers, or tightly parallel, where each computer can be dedicated to the cluster.

Some embodiments can be implemented on a computer cluster or a supercomputer. A computer cluster or a supercomputer can allow quick and exhaustive sweeps of parameter spaces to determine optimal signatures of diseases such as cancer, and/or discover patterns in cancer.

What is claimed is:

1. A method of analyzing mass spectra comprising:

determining an initial distribution of one or more parameters of at least a first molecule;

determining a theoretical modeled mass-to-charge distribution of at least said first molecule without having said first molecule travel in a mass spectrometer using said initial distribution of said one or more parameters; and fitting said modeled mass-to-charge distribution to an empirical mass-to-charge distribution of at least said first molecule after it has traveled in said mass spectrometer to form a fitted modeled mass-to-charge distribution of at least said first molecule.

2. The method of claim 1, wherein the fitting step includes:

deriving a plurality of model basis vectors from the modeled mass-to-charge distribution; and representing the empirical mass-to-charge distribution with a weighted sum of the plurality of the model basis vectors.

3. The method of claim 2, wherein the plurality of model basis vectors includes a wavelet vector.

4. The method of claim 3, wherein the wavelet vector is a standard wavelet vector.

5. The method of claim 3, wherein the wavelet vector is a wavelet vector derived from a lineshape of the modeled mass-to-charge distribution.

6. The method of claim 3, wherein the wavelet vector is a wavelet vector derived from a lineshape of the empirical mass-to-charge distribution.

7. The method of claim 2, wherein the plurality of model basis vectors includes a vaguelette vector.

8. The method of claim 7, wherein the vaguelette vector is derived from a wavelet vector.

9. The method of claim 7, wherein the vaguelette vectors is derived from a lineshape of the modeled mass-to-charge distribution.

10. The method of claim 7, wherein the vaguelette vector is derived from a lineshape of the empirical mass-to-charge distribution.

11. The method of claim 2, further comprising:

filtering the weighted sum of the plurality of model basis vectors.

12. The method of claim 11, wherein said filtering step includes hard thresholding.

13. The method of claim 11, wherein said filtering step includes soft thresholding.

14. The method of claim 1, wherein said fitting step comprises filtering the fitted modeled mass-to-charge distribution.

15. The method of claim 14, wherein said filtering step includes hard thresholding.

16. The method of claim 14, wherein said filtering step includes soft thresholding.

17. The method of claim 14, wherein said filtering step includes filtering with a filter bank.

18. The method of claim 14, wherein said filtering step utilizes a wavelet basis vector or a vaguelette basis vector.

19. The method of claim 1, wherein the fitting step includes an error function.

20. The method of claim 19, wherein the error function is a squared error function or a penalized squared error function.

21. The method of claim 1, wherein the fitted modeled mass-to-charge distribution is used for pattern recognition.

22. The method of claim 21, wherein said pattern recognition is used for finding one or more proteins indicative of one or more diseases.

23. The method of claim 1 wherein said one or more parameters affect time-of-flight of said first molecule.

24. The method of claim 23 wherein said one or more parameters is selected from the group consisting of: initial position, initial energy, ionization, position focusing, extraction source shape, fringe effects of electric field, statistical mechanics of ion gasses, and electronic. hardware artifacts.

25. The method of claim 1 wherein said initial distribution of said one or more parameters is represented by a Gaussian distribution.

26. The method of claim 1 wherein said determining a modeled mass-to-charge distribution step utilizes a time-of-flight function.

27. The method of claim 1 wherein said fitting step involves scaling said modeled mass-to-charge distribution or said empirical mass-to-charge distribution to generate constant lineshape widths.

28. The method of claim 1 wherein said mass spectrometer is a time-of-flight mass spectrometer.

29. The method of claim 1 wherein said fitted modeled mass-to-charge distribution has reduced noise as compared to said empirical mass-to-charge distribution.

30. The method of claim 1 wherein said fitted modeled mass-to-charge distribution has compressed data as compared to said empirical mass-to-charge distribution.

31. The method of claim 1 wherein said fitted modeled mass-to-charge distribution includes recovered data as compared to said empirical mass-to-charge distribution.

32. The method of claim 1 wherein said fitted modeled mass-to-charge distribution has reduced dimensionality as compared to said empirical mass-to-charge distribution.

33. the method of claim 1 wherein said determining an initial distribution occurs prior to said first molecule traveling through said mass spectrometer.

34. A method of analyzing mass spectra comprising:

determining an initial distribution of one or more parameters of at least a first molecule;

determining a modeled mass-to-charge distribution of at least said first molecule using said initial distribution of said one or more parameters;

fitting said modeled mass-to-charge distribution to an empirical mass-to-charge distribution of at least said first molecule after it has traveled in a mass spectrometer to form a fitted modeled mass-to-charge distribution of at least said first molecule, wherein said fifing step includes:

deriving a plurality of model basis vectors from the modeled mass-to-charge distribution; and representing the empirical mass-to-charge distribution with a weighted sum of said plurality of model basis vectors, wherein said plurality of model basis vectors includes a wavelet vector derived from a lineshape of said modeled mass-to-charge distribution.

35. A method of analyzing mass spectra comprising:

determining an initial distribution of one or more parameters of at least a first molecule;

determining a modeled mass-to-charge distribution of at least said first molecule using said initial distribution of said one or more parameters;

fitting said modeled mass-to-charge distribution to an empirical mass-to-charge distribution of at least said first molecule after it has traveled in a mass spectrometer to form a fitted modeled mass-to-charge distribution of at least said first molecule, wherein said fitting step includes:

deriving a plurality of model basis vectors from the modeled mass-to-charge distribution; and representing the empirical mass-to-charge distribution with a weighted sum of said plurality of model basis vectors, wherein said plurality of model basis vectors includes a wavelet vector derived from a lineshape of said empirical mass-to-charge distribution.

36. A method of analyzing mass spectra comprising:

determining an initial distribution of one or more parameters of at least a first molecule;

determining a modeled mass-to-charge distribution of at least said first molecule using said initial distribution of said one or more parameters;

fitting said modeled mass-to-charge distribution to an empirical mass-to-charge distribution of at least said first molecule after it has traveled in a mass spectrometer to form a fitted modeled mass-to-charge distribution of at least said first molecule, wherein said fitting step includes:

deriving a plurality of model basis vectors from the modeled mass-to-charge distribution; and representing the empirical mass-to-charge distribution with a weighted sum of said plurality of model basis vectors, wherein said plurality of model basis vectors includes a vaguelette vector derived from a lineshape of said modeled mass-to-charge distribution.

37. A method of analyzing mass spectra comprising:

determining an initial distribution of one or more parameters of at least a first molecule;

determining a modeled mass-to-charge distribution of at least said first molecule using said initial distribution of said one or more parameters;

fitting said modeled mass-to-charge distribution to an empirical mass-to-charge distribution of at least said first molecule after it has traveled in a mass spectrometer to form a fitted modeled mass-to-charge distribution of at least said first molecule, wherein said fitting step includes:

deriving a plurality of model basis vectors from the modeled mass-to-charge distribution; and representing the empirical mass-to-charge distribution with a weighted sum of said plurality of model basis vectors, wherein said plurality of model basis vectors includes a vaguelette vector derived from a lineshape of said empirical mass-to-charge distribution.

38. A method of analyzing mass spectra comprising:

determining an initial distribution of one or more parameters of at least a first molecule;

determining a modeled mass-to-charge distribution of at least said first molecule using said initial distribution of said one or more parameters;

fitting said modeled mass-to-charge distribution to an empirical mass-to-charge distribution of at least said first molecule after it has traveled in a mass spectrometer to form a fitted modeled mass-to-charge distribution of at least said first molecule, wherein said determining a modeled mass-to-charge distribution step involves scaling said modeled mass-to-charge distribution or said empirical mass-to-charge distribution to generate constant lineshape widths.

* * * * *